Sept. 14, 1954   F. X. RUSSO   2,688,992
SEPARATOR FOR REMOVING YOLK-SURROUNDING
PARTS FROM THE EGG YOLKS
Original Filed Nov. 18, 1950
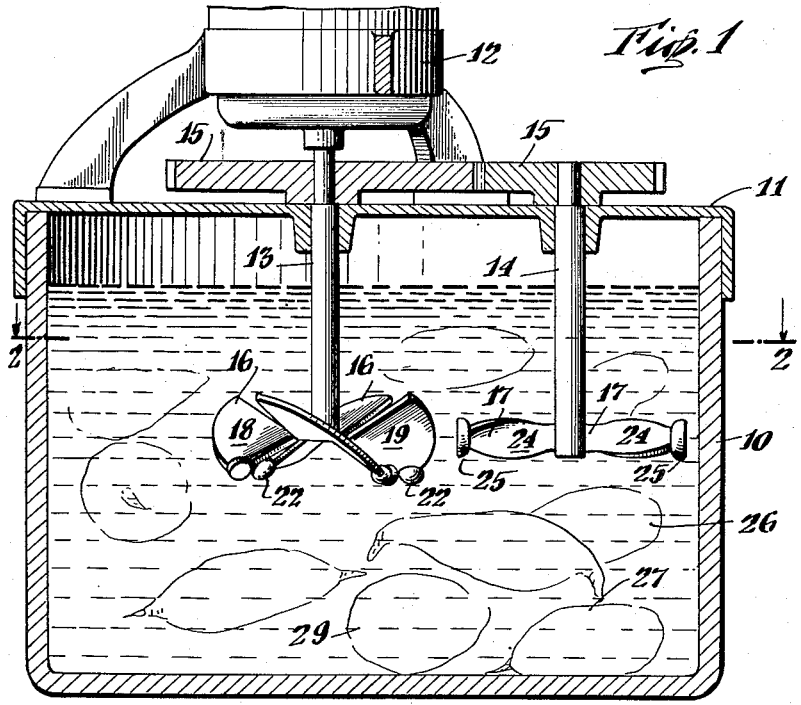
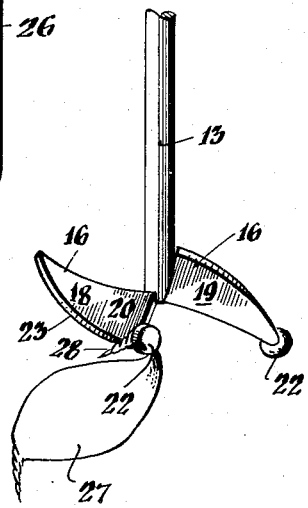
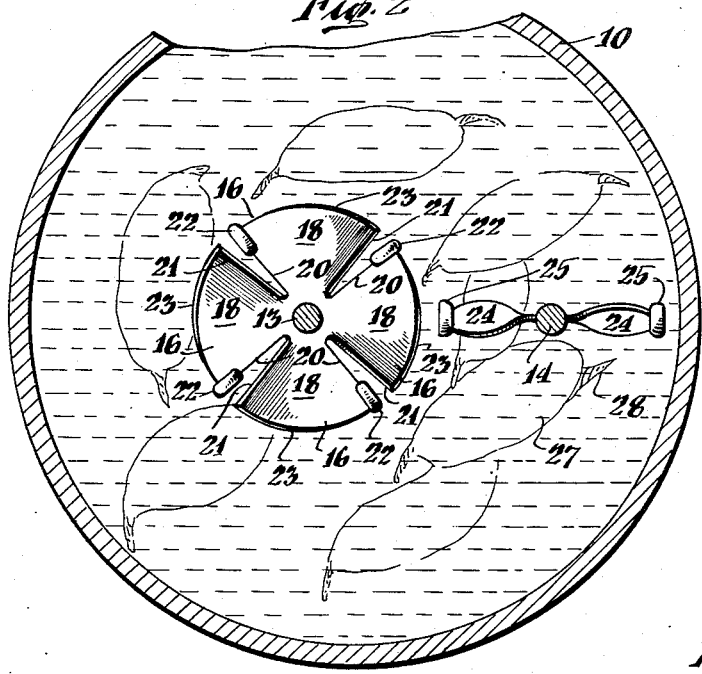
INVENTOR.
Frank X. Russo
BY
Duell and Kane
ATTORNEYS Patented Sept. 14, 1954

2,688,992

UNITED STATES PATENT OFFICE 2,688,992

SEPARATOR FOR REMOVING YOLK-SURROUNDING PARTS FROM THE EGG YOLKS

Frank X. Russo, New York, N. Y., assignor to The Peoples' National Bank, Lynbrook, N. Y.

Continuation of application Serial No. 196,511, November 18, 1950. This application April 22, 1953, Serial No. 350,303

3 Claims. (Cl. 146—2)

This invention relates to the preparation of egg fluid more particularly to the separation of certain portions of the egg.

It is an object of this invention to provide a machine which separates parts of an egg from the remainder of the egg fluid.

It is another object of this invention to provide a separator mechanism which removes the part around an egg yolk from the egg yolk without breaking the egg yolk. These and other objects of this invention will become more apparent upon consideration of the following description taken together with the accompanying drawings in which—

Fig. 1 is a vertical section of the egg separating apparatus of this invention;

Fig. 2 is a horizontal section of the apparatus of Fig. 1 taken on line 2—2 in the direction of the arrows, and Fig. 3 is an elevation of a portion of the separator of this invention.

In general, this invention provides a separator blade immersed in the fluid mass of broken eggs and rotated to engage a part of the egg and to draw it away from the egg yolk, leaving the egg yolk intact.

Referring to Fig. 1, a tank 10 is shown across the open top of which a frame 11 is fitted. A motor 12 is suitably mounted above the frame 11 and drives a separator shaft 13 direct and stirrer shaft 14 through gearing 15. The shafts 13 and 14 extend perpendicularly downward into the tank 10 from the frame 11 to a point about midway between the top and the bottom of tank 10. At the end of shaft 13 are provided separator blades 16. At the end of shaft 14 are provided stirrer blades 17. Each separator blade 16 has an upper surface 18 and a lower surface 19. As the blades 16 move in a circular direction upon rotation of the shaft 13 each of the blades 16 has a leading edge 20 and a trailing edge 21. A rounded protuberance 22 is provided on each leading edge 20 at its outer portion adjacent an outer edge 23 of each blade 16.

The protuberance 22 serves to both blunt the leading edge 20 of each of the blades 16 and to provide a large surface which is moved through the fluid egg mass by the rotation of the shaft 13. The shaft 13 is rotated at a speed of the nature of 60 R. P. M.

The blades 16 traveling through the fluid egg mass at this speed strike and push aside the component parts of the fluid egg mass. However, because of the action of the rounded protuberance 22 and the shape and angle of the blades, these rotations of the blades 16 serve to shove the parts of the egg aside rather than cut through them.

The stirrer blades 17 are each made of two convoluted surfaces 24 at the ends of which are provided rounded knobs 25. The blades 17 with their convoluted surfaces 24 and rounded knobs 25 rotate in the fluid egg mass with the shaft 14 but do not cut up the egg parts but simply shove them aside. The fluid egg mass 26 is impelled by the rotation of the stirrer blades 17 into the path of rotation of the separator blades 16. The fluid egg mass is made up primarily of egg yolks 27 and other parts 28. The egg yolks 27 with the parts 28 are suspended in a more fluid white of egg 29. The effect of the stirrer blade 17 is to direct the egg yolks 27 and parts 28 into the path of the separator blades 16.

As shown in Fig. 1, the blades 16 are attached to the shaft 13 at an inclined angle to the axis of the shaft, the leading edges 20 being below and the trailing edges 21 being the upper edges.

As seen in Fig. 2 the separator blades 16 are formed to provide a shape similar to a Maltese cross, the leading edge 20 of one blade being slightly separated in the horizontal plane from the trailing edge of the proceeding blade 16. As all of the leading and trailing edges 20 and 21 respectively terminate in the same plane at the end of the shaft 13 the leading edges 20 extend downwardly in a vertical plane from this center area, while the trailing edges 21 extend upwardly vertical from the trailing center. Consequently, the upper surfaces 18 and the lower surfaces 19 have a helical shape. Similarly, the stirrer blade 17 shall extend radially from the shaft 14 having a twisted or convoluted shape which provides the surfaces 24 with a helical shape.

Both shafts 13 and 14 are rotated at approximately 60 R. P. M. At this speed the egg yolks are shoved into the path of the separator blades 16 by the stirrer blades 17 and the blades 16 engage and entangle the parts 28. As the blade 16 strikes the egg yolk 27 which has been projected into its path, the rounded protuberance 22 engages the yolk 27. Due to the angle of the leading edge 20 which carries the protuberance 22 the yolk is forced downward and radially outward from the stirrer blade 16, while the part 28 becomes engaged on the moving edge 20. The continued motion of the blade 16 trapping the part 28 pulls it from the egg yolk. The part 28 hangs on the blade 16 and with the continued rotation of the stirrer wraps itself around the blade. A number of parts 28 are thus collected on the stirrer blade 16. Periodically, the stirrer is removed from the tank by raising the frame 11, or other means, and the collected parts 28 are removed from the blade.

In Fig. 3 there is shown an egg yolk being engaged and deflected by the blade 16.

After the parts 28 have been removed from the fluid egg mass 26 the egg yolks can easily be broken up and the contained fluid mixed with the fluid 29 of the white of egg. This removal is accomplished, according to this invention, in such a manner that no reaction between the chemical of the egg part and the compounds within the egg yolk is possible.

Various modifications of the above described embodiment of this invention are possible. For example, the number of separator blades may be increased by adding additional sets of blades around the shaft 13 suitably axially spaced from the adjacent sets of blades. This spacing should be sufficient to allow the above described action for each set of separator blades 16. In view of these and other modifications which do not depart from the spirit of the invention it is intended that this invention be limited only by the scope of the appended claims.

This application is a continuation of my pending application Serial Number 196,511 filed November 18, 1950, now abandoned.

I claim:

1. In a machine for removing parts from a fluid egg mass the combination of a bladed rotatable member, a radial blade on and extending from said member, a leading edge on said blade inclined with relation to the radial plane perpendicular to the axis of rotation, a blunt rounded protuberance at the radial outer end of said blade, said protuberance having a large rounded leading surface, a neck on the rear surface of said protuberance attaching said protuberance with said blade, said neck being relatively narrower than said large rounded leading surface whereby said egg yolks are deflected from said blade and said egg membranes are retained on said blade by said protuberance.

2. In a machine for removing parts from a fluid egg mass the combination of a bladed rotatable member, a blade on said member diagonally inclined with relation to the axis of rotation, a downwardly inclined leading edge of said blade extending radially from said axis, a blunt rounded protuberance at the radial outer end of said blade, said protuberance having a large rounded leading surface, a neck on the rear surface of said protuberance attaching said protuberance with said blade, said neck being relatively narrower than said large rounded leading surface whereby said egg yolks are deflected from said blade and said egg membrances are retained on said blade by said protuberance.

3. In a machine for removing components of a fluid egg mass, the combination of a first rotatable shaft, a first radial blade on and extending from said shaft, a leading edge on said blade inclined with relationship to the radial plane perpendicular to the axis of rotation, a first blunt rounded protuberance at the radial outer end of said blade, said protuberance having a large rounded leading surface, a neck on the rear surface of said protuberance attaching said protuberance with said blade, said neck being relatively narrower than said large rounded leading surface, a second rotatable shaft, a second convoluted radial blade on and extending from said second rotatable shaft, and a second blunt rounded protuberance at the radial outer end of said blade whereby said components of said fluid egg mass are directed into the path of said radial blades of said first rotatable shaft by the convoluted blades of said second shaft and parts of said fluid egg mass are retained on said radial blade by said first protuberance.

No references cited.